United States Patent
Kubo et al.

(10) Patent No.: US 11,506,644 B2
(45) Date of Patent: Nov. 22, 2022

(54) MASS SPECTRUM PROCESSING APPARATUS AND METHOD

(71) Applicant: JEOL Ltd., Tokyo (JP)

(72) Inventors: Ayumi Kubo, Tokyo (JP); Masaaki Ubukata, Tokyo (JP)

(73) Assignee: JEOL Ltd., Tokyo (JP)

( * ) Notice: Subject to any disclaimer, the term of this patent is extended or adjusted under 35 U.S.C. 154(b) by 436 days.

(21) Appl. No.: 16/742,263

(22) Filed: Jan. 14, 2020

(65) Prior Publication Data
US 2020/0232955 A1    Jul. 23, 2020

(30) Foreign Application Priority Data

Jan. 18, 2019    (JP) .............................. JP2019-006807

(51) Int. Cl.
| *H01J 49/10* | (2006.01) |
| *G01N 30/72* | (2006.01) |
| *H01J 49/04* | (2006.01) |
| *H01J 49/00* | (2006.01) |

(52) U.S. Cl.
CPC ...... *G01N 30/7206* (2013.01); *H01J 49/0422* (2013.01); *H01J 49/0009* (2013.01); *H01J 49/10* (2013.01)

(58) Field of Classification Search
CPC .............. G01N 30/7206; H01J 49/0422; H01J 49/0009; H01J 49/10; H01J 49/107; H01J 49/0045
USPC .................................. 250/281, 282; 73/23.37
See application file for complete search history.

(56) References Cited

U.S. PATENT DOCUMENTS

| 3,405,263 A | 10/1968 | Wanless et al. |
| 3,984,692 A * | 10/1976 | Arsenault ............. H01J 49/147 250/427 |
| 7,462,821 B2 * | 12/2008 | Barket, Jr ........... H01J 49/0031 250/281 |
| 10,804,086 B2 * | 10/2020 | Nagatomo .......... H01J 49/0036 |
| 2009/0230298 A1 | 9/2009 | Yamaguchi |
| 2009/0302210 A1 | 12/2009 | Castro-Perez et al. |
| 2018/0284065 A1 | 10/2018 | Yamamoto et al. |

FOREIGN PATENT DOCUMENTS

| JP | 1164285 A | 3/1999 |
| JP | 2017129534 A | 7/2017 |
| JP | 20184298 A | 1/2018 |
| JP | 2018004298 A * | 1/2018 |
| WO | 2017060991 A1 | 4/2017 |

OTHER PUBLICATIONS

Office Action issued in JP 2019-006807 dated Dec. 15, 2020.
Extended European Search Report issued in EP20152014.5 dated Jun. 15, 2020.

* cited by examiner

*Primary Examiner* — Michael Maskell
(74) *Attorney, Agent, or Firm* — The Webb Law Firm (57) ABSTRACT

A first mass spectrum including a fragment ion peak is generated under application of a first ionization method. A second mass spectrum including a molecular ion peak is generated under application of a second ionization method. These mass spectra are synthesized to generate a synthesized mass spectrum. On the synthesized mass spectrum, difference information, such as a mass difference and difference composition, is calculated between the molecular ion peak and the fragment ion peak.

8 Claims, 12 Drawing Sheets

| DIFFERENCE COM-POSITION | SUBSTRUCTURE |
|---|---|
| OH | —OH |
| C2H3O | (acetyl group: C(=O)—CH₃) |
| CHO2 | (carboxyl group: C(=O)—OH) |
| C6H5 | (phenyl group) |
| ... | |

MASS SPECTRUM PROCESSING APPARATUS AND METHOD

CROSS REFERENCE TO RELATED APPLICATION

This application claims priority to Japanese Patent Application No. 2019-006807 filed Jan. 18, 2019, the disclosure of which is hereby incorporated by reference in its entirety.

BACKGROUND OF THE INVENTION

Field of the Invention

The present disclosure relates to mass spectrum processing apparatus and method, and more particularly to processing of a plurality of mass spectra obtained using a plurality of types of ion sources.

Description of the Related Art

A mass spectroscopy system includes, for example, a gas chromatograph apparatus, a mass spectrometer, and an information processing device. The information processing device typically controls operations of the gas chromatograph apparatus and the mass spectrometer, and processes data obtained by mass spectroscopy. For example, the information processing device functions as a mass spectrum processor. The information processing device may be incorporated in the mass spectrometer.

The mass spectrometer includes an ion source that ionizes compounds contained in a sample. Various types of ion sources are provided in accordance with various types of ionization. For example, Electron Ionization (EI) is known as a hard ionization method. EI facilitates fragmentation of molecular ions, which makes it difficult to observe molecular ions, while making it easy to observe fragment ions (actually a plurality of types of fragment ions). Meanwhile, Field Ionization (FI), Chemical Ionization (CI), Field Desorption Ionization (FD), and Photoionization (PI), for example, are known as soft ionization methods. These soft ionization techniques cause little or no fragmentation of molecular ions, which makes it easy to observe molecular ions and protonated molecular ions.

It is possible to estimate a composition, or difference composition, of a desorbed portion from a mass difference, which is an m/z difference, to be accurate, between fragment ions and molecular ions. The mass difference is also referred to as a neutral loss.

When a hard ionization method is used to obtain information concerning the mass difference and the difference composition, for example, (hereinafter referred to as "difference information") between a fragment ion peak and a molecular ion peak in a mass spectrum, observation of fragment ions is easy, whereas observation of molecular ions is difficult. Specifically, according to the hard ionization, the intensity of a molecular ion peak is low in a mass spectrum, raising a possibility of erroneously specifying a molecular ion peak. Also, the molecular ion peak may be a noise level or lower in a mass spectrum. In contrast, when a soft ionization method is used, while the molecular ion peak can be easily specified in a mass spectrum, a fragment ion peak does not often appear in a mass spectrum.

JP H11-64285 A discloses calculation of a mass difference based on a mass spectrum generated under application of electron ionization and a mass spectrum generated under application of chemical ionization. This document, however, nowhere discloses generation of a new mass spectrum from the two mass spectra.

SUMMARY

An embodiment of the disclosure is directed toward providing a mass spectrum processing apparatus and method which enable obtaining of accurate difference information. Alternatively, an embodiment of the disclosure is directed toward providing an image which facilitates recognition of information concerning a desorbed portion.

In accordance with an aspect of the disclosure, a mass spectrum processing apparatus includes a synthesizer that synthesizes a first mass spectrum including a fragment ion peak and a second mass spectrum including molecular ion peak to generate a synthesized mass spectrum, and a difference information calculator that calculates difference information between the fragment ion peak and the molecular ion peak, on the synthesized mass spectrum. In the mass spectrum processing apparatus, the first mass spectrum is generated under application of a first ionization method, and the second mass spectrum is generated under application of a second ionization method that is different from the first ionization method.

In accordance with another aspect of the disclosure, a mass spectrum processing method includes synthesizing a first mass spectrum including a fragment ion peak and a second mass spectrum including a molecular ion peak to generate a synthesized mass spectrum, calculating difference information between the fragment ion peak and the molecular ion peak, and displaying the difference information along with the synthesized mass spectrum. In the mass spectrum processing method, the first mass spectrum is generated under application of a first ionization method, and the second mass spectrum is generated under application of a second ionization method that is different from the first ionization method.

BRIEF DESCRIPTION OF DRAWINGS

Embodiment(s) of the present disclosure will be described based on the following figures, wherein.

DESCRIPTION OF EMBODIMENTS

Embodiments of the disclosure will be described by reference to the drawings.

(1) Summary of Embodiments

A mass spectrum processing apparatus according to an embodiment includes a synthesizer and a difference information calculator. The synthesizer synthesizes a first mass spectrum including a fragment ion peak and a second mass spectrum including a molecular ion peak to generate a synthesized mass spectrum. The difference information calculator calculates difference information between the fragment ion peak and the molecular ion peak on the synthesized mass spectrum. The first mass spectrum is generated under application of a first ionization method and the second mass spectrum is generated under application of a second ionization method that is different from the first ionization method.

The above structure generates the first mass spectrum and the second mass spectrum using two different ionization methods. For example, the first ionization method is a hard ionization method; in this case, the first mass spectrum includes a comparatively great number of fragment ion peaks. The second ionization method is a soft ionization method; in this case, the second mass spectrum includes a comparatively clear molecular ion peak. Two mass spectra having different features, which are obtained from the same sample, are synthesized, to generate a synthesized mass spectrum having more information than that obtained from a single mass spectrum. The mass spectrum processing apparatus thus configured calculates difference information based on such a synthesized mass spectrum. In an embodiment, the mass spectrum processing apparatus includes a processor, which functions as a synthesizer, a difference information calculator, a substructure estimator, a normalizer, a corrector, and other devices.

In the above structure, the difference information includes at least one of information representing a difference in the mass-to-charge ratio and information representing a difference in the composition. The difference information may further include information representing a substructure. The molecular ion peak is a peak that serves as a reference in calculating the difference information; that is, a reference peak. A protonated molecular ion peak or a deprotonated molecular ion peak may be used as a reference peak.

In an embodiment, the mass spectrum processing apparatus includes a display that displays the difference information along with the synthesized mass spectrum. In the embodiment, the display corresponds to a display unit or a display section. The display may show the difference information with a relationship between the fragment ion peak and the molecular ion peak included in the synthesized mass spectrum. Typically, a plurality of fragment ion peaks are specified and a plurality of difference information items are calculated, and then these difference information items are displayed along with the synthesized mass spectrum, or more desirably, in a superposed manner with the synthesized mass spectrum. A search range for the fragment ion peak may be designated by a user on the synthesized mass spectrum.

In an embodiment, the mass spectrum processing apparatus includes a substructure estimator that estimates a substructure based on the difference information. The display may show information representing the substructure, in addition to the synthesized mass spectrum and the difference information.

In an embodiment, the synthesizer includes a normalizer that normalizes at least one of the first mass spectrum and the second mass spectrum in the intensity axis direction, in synthesizing the first mass spectrum and the second mass spectrum. As the form of the mass spectrum changes depending on the ionization method, the first mass spectrum and the second mass spectrum may be synthesized after adjusting the intensity of at least one of the first mass spectrum and the second mass spectrum.

In an embodiment, the synthesizer includes a corrector that corrects a misalignment in the m/z axis direction between the first mass spectrum and the second mass spectrum when synthesizing the first mass spectrum and the second mass spectrum. The corrector corrects a misalignment of sampling points or a misalignment of peaks in the m/z axis direction between the first mass spectrum and the second mass spectrum. The correction includes interpolation. The above structure may eliminate or reduce a misalignment to allow generation of a more correct synthesized mass spectrum.

The mass spectrum processing apparatus according to an embodiment includes a unit that generates a first chromatogram under application of a first ionization method and generates a second chromatogram under application of a second ionization method, and a unit that generates a first mass spectrum and a second mass spectrum for each of peak pairs between the first chromatogram and the second chromatogram. The synthesizer generates a synthesized mass spectrum for each peak pair. A process for matching or aligning the peaks between two chromatograms may be applied.

A mass spectrum processing method according to an embodiment includes synthesizing a first mass spectrum including a fragment ion peak and a second mass spectrum including a molecular ion peak to generate a synthesized mass spectrum, calculating difference information between the fragment ion peak and the molecular ion peak, and displaying the difference information along with the synthesized mass spectrum. The first mass spectrum is generated under application of a first ionization method, and the second mass spectrum is generated under application of a second ionization method that differs from the first ionization method. In an embodiment, the difference information is calculated on the synthesized mass spectrum. In a modification example, the difference information may be calculated using the first mass spectrum and the second mass spectrum without using the synthesized mass spectrum. In such a structure, the synthesized mass spectrum is also displayed with the difference information.

The mass spectrum processing method according to an embodiment is implemented by hardware function or software function. In the latter case, a program for executing the mass spectrum processing method is installed in an information processing device via a network or via a portable storage medium. The information processing device conceptually includes a computer, a controller, a mass spectrometer, and the like.

(2) Details of Embodiments

Figure 1:
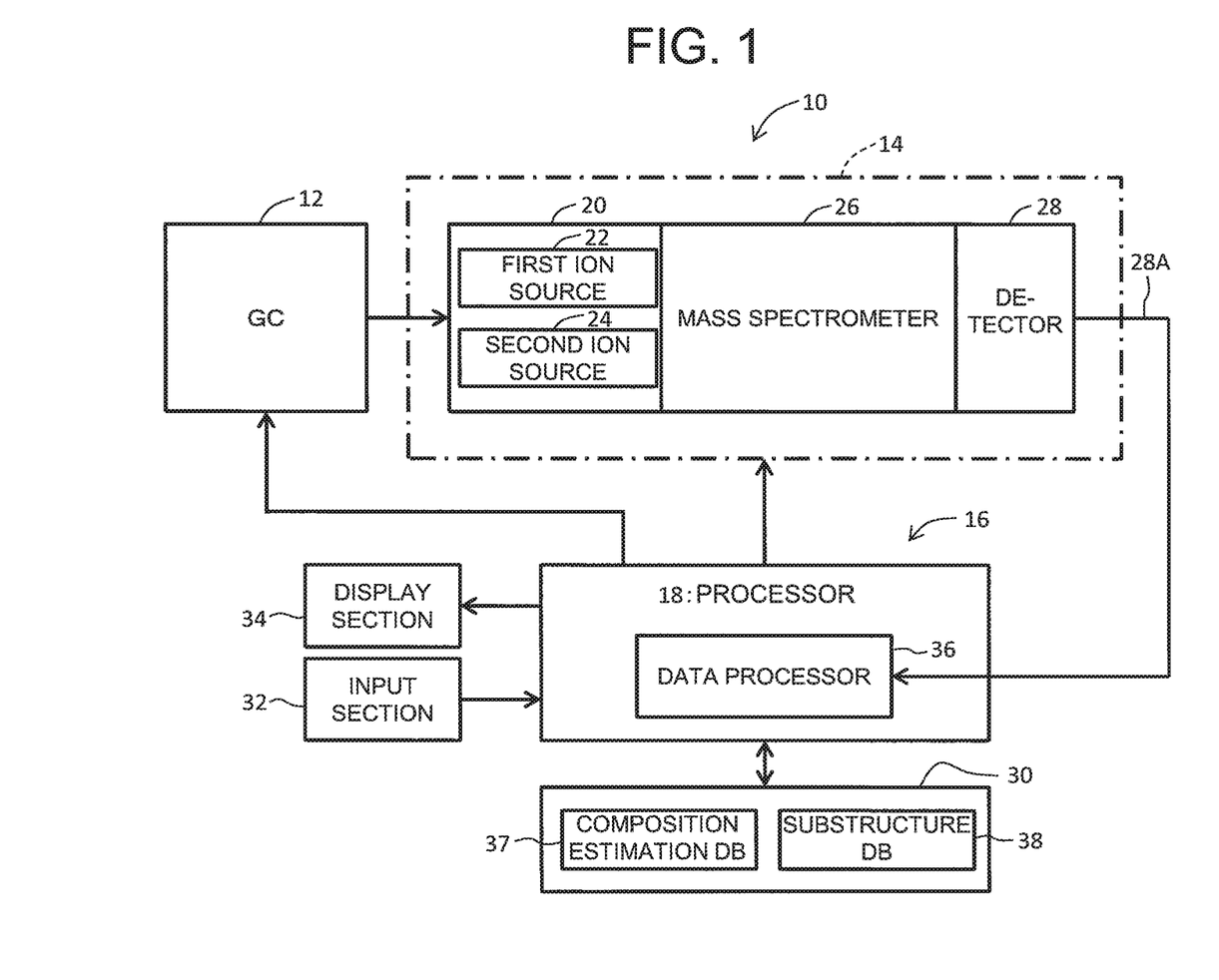
FIG. 1 illustrates a mass spectroscopy system according to an embodiment.

FIG. 1 illustrates an example structure of the mass spectroscopy system according to an embodiment. A mass spectroscopy system 10 separates a plurality of compounds contained in an original sample in terms of time, and then performs mass spectroscopy with respect to the individual compounds. The mass spectroscopy system 10 as illustrated specifically includes a gas chromatograph apparatus 12, a mass spectrometer 14, and an information processing device 16. The gas chromatograph apparatus 12 may be omitted. In place of the gas chromatograph apparatus 12, a liquid chromatograph apparatus, for example, may be employed.

An original sample supplied to the gas chromatograph apparatus 12 is output as a plurality of compounds that are separated in terms of time. Each of the plurality of compounds is a sample for the mass spectrometer 14. The plurality of separated compounds are sequentially supplied to the spectrometer 14. In the illustrated example structure, the mass spectrometer 14 includes an ion source unit 20, a mass spectrometer 26, and a detector 28. In the embodiment, two measurement events, each measurement event including component separation and mass spectroscopy, are executed repeatedly with respect to a single original sample, as will be detailed below.

In the embodiment, the ion source unit 20 includes a first ion source 22 and a second ion source 24 that are selectively used. The first ion source 22 is a hard ion source, which is an ion source based on electron ionization. The first ion source 22 may generate a comparatively great number of fragment ions.

The second ion source 24 is a soft ion source, which is an ion source based on field ionization. The second ion source 24 is unlikely to generate fragment ions, while being capable of clearly detecting molecular ions. The second ionization may include, in addition to the field ionization, chemical ionization, field desorption ionization, and photoionization, for example. In the two measurement events, the ion source to be actually used is sequentially selected by electrical, mechanical, or manual switching. The order of the ion source to be selected may be determined as desired.

The selected ion source generates ions from the sample supplied thereto. The ions are guided, by the action of electric field, to the mass spectrometer 26. Here, two line mass spectroscopy subsystems may be disposed in parallel to each other. In this case, two ion sources may be operated in parallel, and individual mass spectroscopy subsystems include a mass spectrometer and a detector, as described below.

The mass spectrometer 26 performs mass spectroscopy with respect to an ion based on the mass-to-charge ratio (m/z) of the ion. For example, if the mass spectrometer 26 is a time-of-flight mass spectrometer, individual ions are detected by the detector 28 after time-of-flight in accordance with the mass-to-charge ratios of the ions. Other types of mass spectrometer, including, for example, a magnetic sector mass spectrometer and a quadrupole mass spectrometer, may be used. The detector 28 detects ions, and specifically includes an electron multiplier. The detector 28 outputs a detection signal 28A, which is transmitted to the information processing device 16 via a signal processing circuit which is not shown.

The information processing device 16 includes a processor 18, a memory 30, an input section 32, and a display section 34, for example. The processor 18 is formed of a CPU that executes a program, for example. In place of the processor 18, or along with the processor 18, various calculation devices may be used. The information processing device 16 may be formed of a plurality of computers, part of which function over a network.

The processor 18 functions as a calculator, a controller, and a processor. FIG. 1 illustrates data processing function of the processor 18 as a data processor 36. The data processor 36 functions as a chromatogram generator, a mass spectrum generator, a mass spectrum synthesizer, a difference information calculator, a composition estimator, a substructure estimator, and a display processor, for example.

The memory 30 includes a semiconductor memory, and a hard disc, for example. The memory 30 stores therein a plurality of programs to be executed by the CPU, including a spectrum processing program. A composition estimation database 37 and a substructure estimation database 38 are formed on the memory 30. These databases 37 and 38 may be formed on a storage connected to the information processing device 16 via network.

The input section 32 is formed of a keyboard and a pointing device, for example. A user selects a peak and inputs processing conditions, for example, through the input section 32. The display section 34 functions as a display, and is specifically formed of a liquid crystal display unit, an organic EL device, or other devices. The display section 34 displays, on its display screen, a chromatogram, a mass spectrum, a synthesized mass spectrum, difference information, and a substructure, for example. The difference information which is displayed includes at least one of the mass difference (that is, m/z difference) or a difference composition, which may also be referred to as a composition difference.

Figure 2:
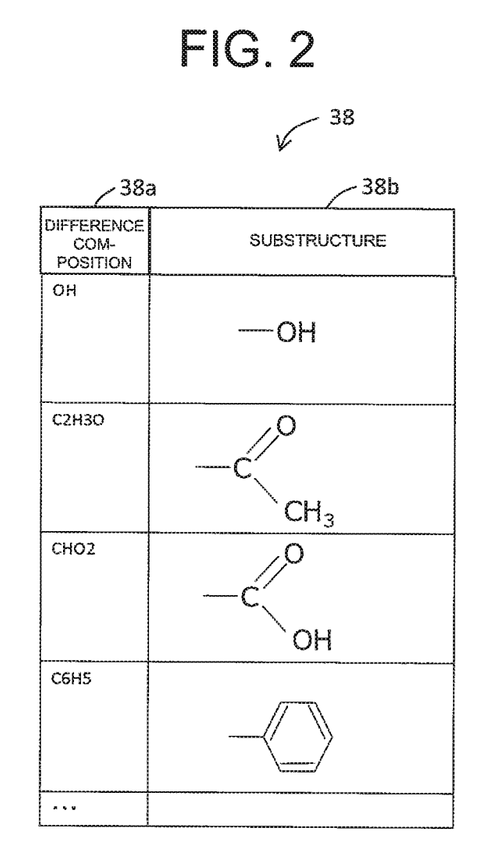
FIG. 2 illustrates an example structure of a substructure estimation table.

FIG. 2 illustrates an example structure of the substructure estimation database 38. Reference numeral 38a denotes a difference composition which is specified by a mass difference or is specified as a difference between two compositions. Reference numeral 38b denotes a substructure corresponding to a difference composition. The difference composition 38a is expressed as a composition formula or a rational formula, and the substructure 38b is expressed as a structural formula. The substructure 38b may include a functional group and a benzene ring, for example. This substructure estimation database 38 enables estimation of the substructure from the estimated difference composition. In a modification example, the substructure may be estimated directly from a mass difference.

Figure 3:
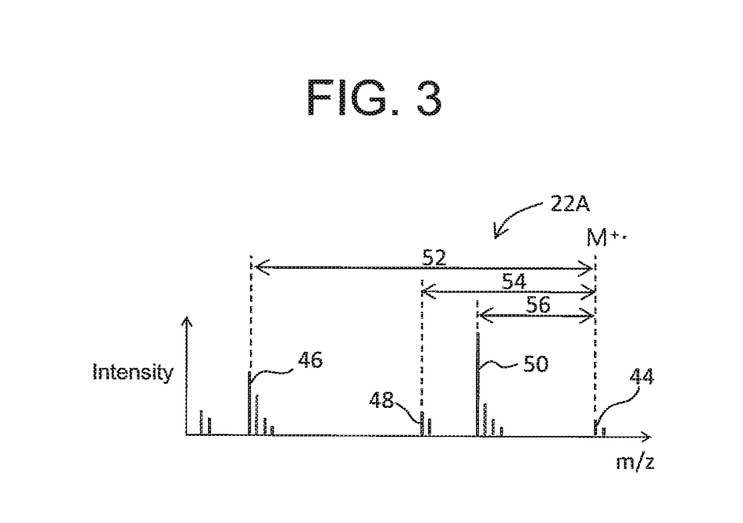
FIG. 3 illustrates an example of a first mass spectrum.

FIG. 3 illustrates a mass spectrum 22A generated using the first ion source. The mass spectrum 22A includes a molecular ion peak 44, and fragment ion peaks 46, 48, and 50. The mass spectrum 22A may also include a protonated molecular ion peak or an isotopic peak.

The mass difference between the molecular ion peak 44 and the fragment ion peak 46 is indicated by reference numeral 52, the mass difference between the molecular ion peak 44 and the fragment ion peak 48 is indicated by reference numeral 54, and the mass difference between the molecular ion peak 44 and the fragment ion peak 50 is indicated by reference numeral 56. These mass differences are used to specify compositions of a plurality of desorbed portions, which allows estimation of the structure of a sample. However, the molecular ion peak 44 in the mass spectrum 22A has a low intensity and may therefore be misapprehended. Also, the molecular ion peak 44 may be lower than a noise level.

Figure 4:
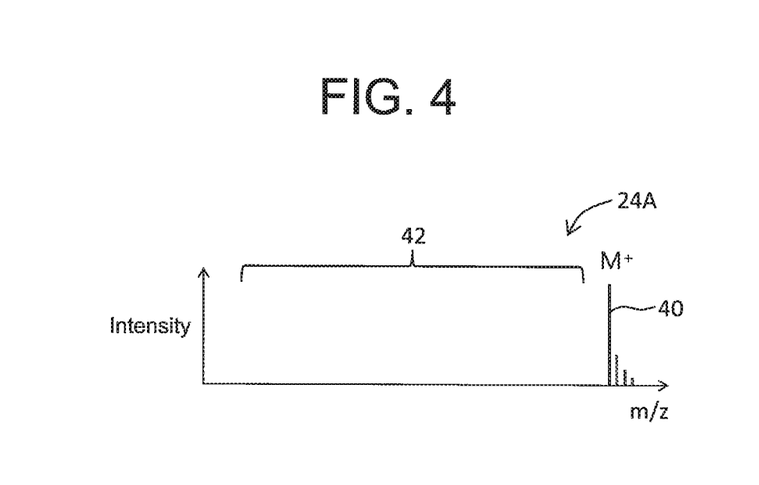
FIG. 4 illustrates an example of a second mass spectrum.

FIG. 4 illustrates a mass spectrum 24A generated using the second ion source. The mass spectrum 24A includes a molecular ion peak 40 which has a comparatively high intensity and can therefore be easily identified. An isotopic peak or a protonated molecular ion peak may be acknowledged near the molecular ion peak 40. The second ion source enables clear identification of the molecular ion peak 40 on the mass spectrum 24A. In this case, however, fragment peaks cannot be easily observed, as indicated by reference numeral 42.

As described above, each of the two types of mass spectra has both advantages and disadvantages. In the embodiment, the advantages of the two mass spectra are used together. Hereinafter, referring to FIG. 5 to FIG. 8, data processing according to an embodiment will be described.

Figure 5:
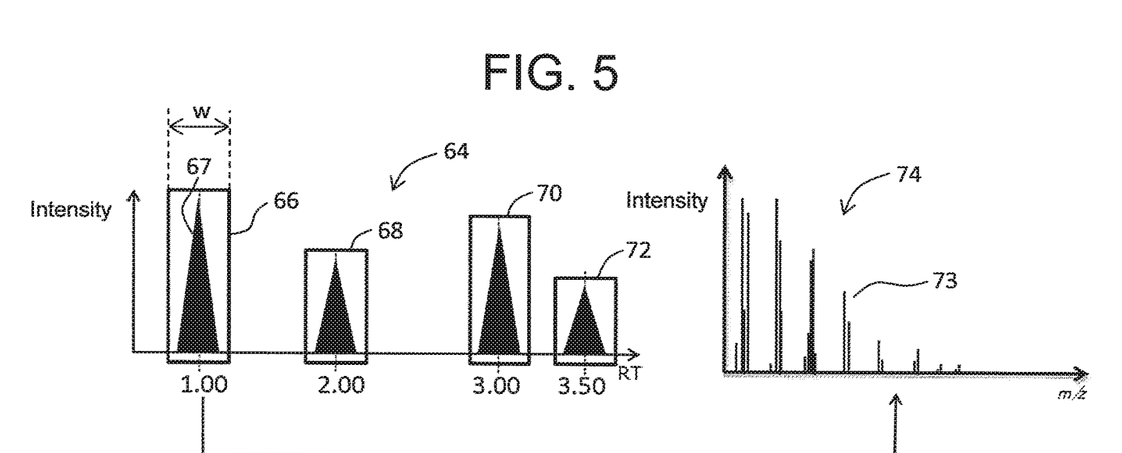
FIG. 5 illustrates a relationship between a first gas chromatograph and the first mass spectrum.

FIG. 5 illustrates a first chromatogram 64 generated using the first ion source. In FIG. 5, the vertical axis indicates the intensity of total ion current (TIC), and the horizontal axis indicates retention time (RT). The first chromatogram 64, as well as a second chromatogram described below, is generated by the data processor 36 illustrated in FIG. 1, based on a detection signal. In the first chromatogram 64, a plurality of peaks 67 are generated at different times on the retention time axis. Windows 66, 68, 70, and 72 are set for the plurality of peaks 67, respectively, and a mass spectrum is integrated within each of the windows 66, 68, 70, and 72. In the figure, a sign "w" indicates the width of the window 66, which is preset or individually or dynamically set. The data processor 36 illustrated in FIG. 1 generates the mass spectra repeatedly at a fixed timing on the retention time axis based on the detection signal.

For each of the windows 66, 68, 70, and 72, a plurality of mass spectra observed within the predetermined period are integrated to generate a first mass spectrum. FIG. 5 illustrates a first mass spectrum 74 generated by integrating a plurality of mass spectra observed within the window 66. In the first mass spectrum 74, a molecular ion peak is unclear, whereas, a large number of fragment ion peaks appear as indicated by reference numeral 73.

Figure 6:
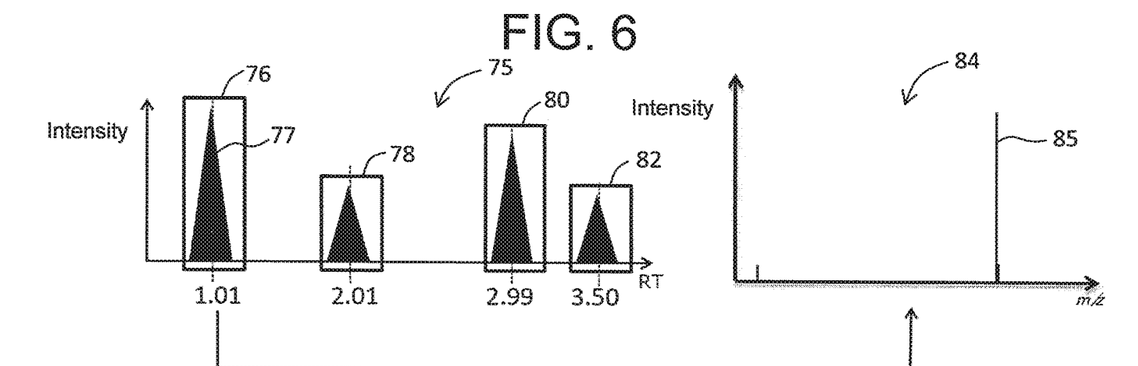
FIG. 6 illustrates a relationship between a second gas chromatograph and the second mass spectrum.

FIG. 6 illustrates a second chromatogram 75 generated using the second ion source. Similar to the first chromatogram 64 illustrated in FIG. 5, in the second chromatogram 75, a plurality of peaks 77 are generated at different times on the retention time axis and windows for integration 76, 78, 80, and 82 are set for the respective peaks. The positions where the plurality of peaks 67 and 77 are generated are slightly misaligned between the first chromatogram 64 and the second chromatogram 75 in the retention time axis direction. In an embodiment, in consideration of such a misalignment, correspondence; that is, pairing, of the peaks is performed between the first chromatogram 64 and the chromatogram 75. In this case, a peak in one chromatogram may be used as a reference for setting a search range in the other chromatogram, so that a peak may be searched within the search range. Alternatively, a method using the center of gravity, a method using waveform fitting, and other methods may be employed.

In the plurality of windows 76, 78, 80, and 82, the mass spectra are integrated to generate a plurality of second mass spectra. FIG. 6 illustrates a second mass spectrum 84 generated by integration of mass spectra within the window 76. In the second mass spectrum 84, fragment ion peaks are hardly identified, whereas a molecular ion peak 85 is clear.

As described above, a mass spectrum pair is generated for each paired peak between the two chromatograms. Spectrum synthesis as will be described below is executed for each pair of mass spectra.

Figure 7:
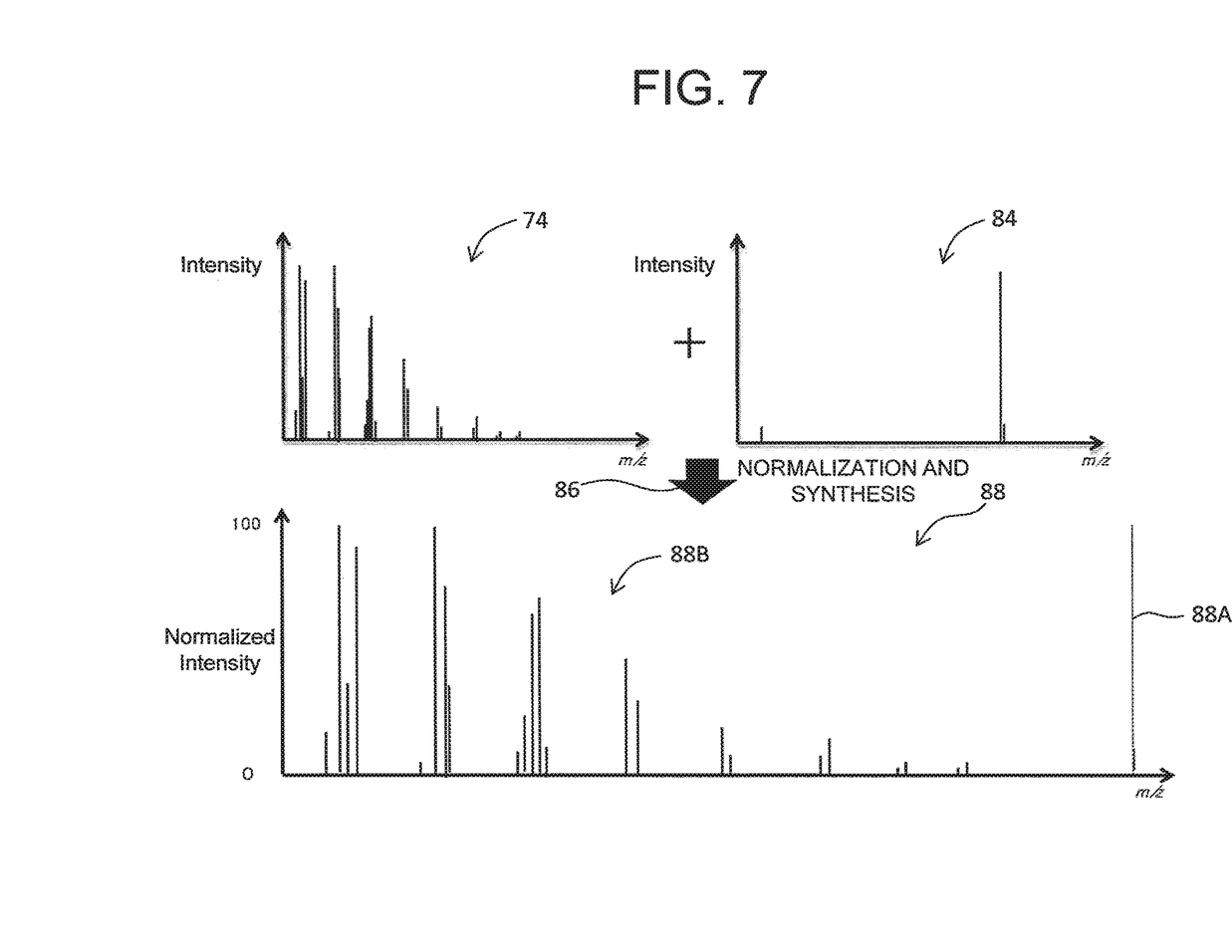
FIG. 7 illustrates synthesis of the first mass spectrum and the second mass spectrum.

FIG. 7 illustrates mass spectrum synthesis. As indicated by reference numeral 86, the first mass spectrum 74 and the second mass spectrum 84, after being normalized as required, are synthesized, thereby forming a synthesized mass spectrum 88. Normalization refers to adjustment of the intensity in the direction of the vertical axis; for example, the intensity is adjusted such that the maximum peaks included in the respective mass spectra 74 and 84 match the 100% level. The vertical axis in each of the first mass spectrum 74 and the second mass spectrum 84 indicates relative intensity. It is not necessary to match the scales of the vertical axes between the first mass spectrum 74 and the second mass spectrum 84 in calculating the difference information. Therefore, the first mass spectrum 74 and the second mass spectrum 84 are normalized such that one is not too small relative to the other, for ease of visual recognizability. However, it may be that case that only one of the mass spectra is normalized. As described below, when there is a misalignment in the direction of the horizontal axis between the two mass spectra, correction in the horizontal axis direction may be performed.

As described above, the first mass spectrum 74 and the mass spectrum 84 are synthesized to generate the synthesized mass spectrum 88. The vertical axis indicates normalized intensity. The synthesized mass spectrum 88 includes a molecular ion peak 88A having an apparently high intensity and fragment ion peaks (see reference numeral 88B) having an apparently comparatively high intensity. The synthesized mass spectrum may be subjected to processing for removing an isotopic peak and noise contained therein.

Figure 8:
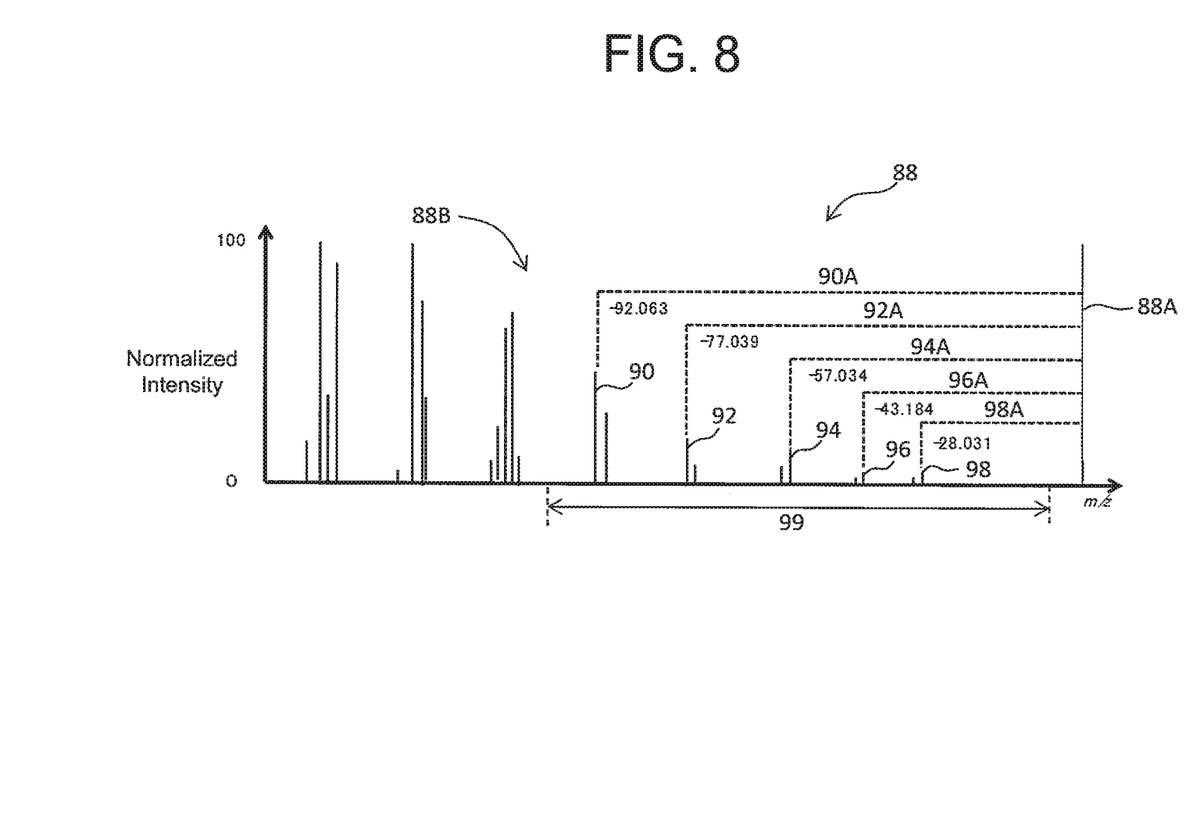
FIG. 8 illustrates a first display example.

FIG. 8 illustrates a first display example. With reference to FIG. 8, calculation and display of the difference information will be described. On the synthesized mass spectrum 88, all or some fragment ion peaks of the fragment ion peaks 88B, and the molecular ion peak 88A are specified by a user or by peak analysis. In this case, the molecular ion peak 88A may be first specified to determine a search range 99 using the m/z of the molecular ion peak 88A as a reference. In determining opposite ends of the search range 99, the user may designate an upper limit value (m/z), such as −10, and a lower limit value (m/z), such as −200, for example. Once the search range 99 is determined, one or more fragment ion peaks are automatically searched within the search range 99. In the example illustrated in FIG. 8, five fragment ion peaks, 90 to 98, are specified.

After the peak search, five mass differences (m/z differences) are calculated between the molecular ion peak 88A and the five fragment ion peaks 90 to 98, respectively. The display example illustrated in FIG. 8 shows five numerical values representing the five mass differences. Specifically, the illustrated example shows five dashed lines 90A, 92A, 94A, 96A, and 98A representing relationships between the molecular ion peak 88A and the five fragment ion peaks 90 to 98, respectively, and further shows five mass differences near the corresponding dashed lines 90A to 98A, respectively.

The synthesized mass spectrum 88 is used in calculating the difference information, and comparison of peak levels is not performed between the molecular ion peak 88A and the individual fragment ion peaks. Therefore, normalization of one or both of the first mass spectrum and the second mass spectrum in synthesizing these mass spectra would not basically affect the calculation of the difference information. If the second mass spectrum includes fragment ion peaks, or the first mass spectrum includes a molecular ion peak, resulting in an increase in the number of peaks after the spectrum synthesis and affecting the peak search, peak integration may be performed in synthesizing the spectrum, as will be described below.

In the first display example, the peaks belonging to the first mass spectrum and the peaks belonging to the second mass spectrum may be displayed in an identifiable manner. For example, these peaks may be expressed in different hues. The m/z of the molecular ion peak may be specified as the maximum peak in the second mass spectrum before the spectrum synthesis and may be used after the spectrum synthesis.

Figure 9:
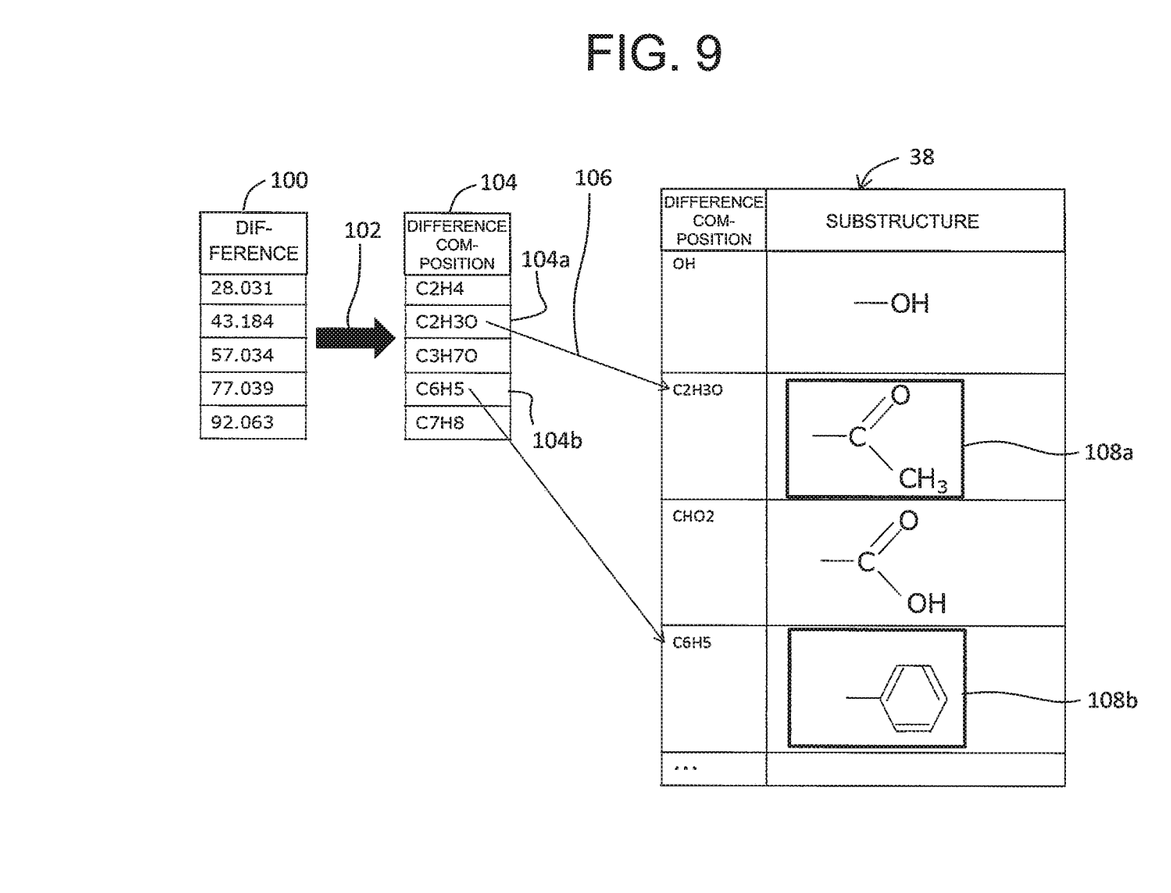
FIG. 9 illustrates a substructure estimation method.

FIG. 9 illustrates a method for estimating substructures. Reference numeral 100 denotes a plurality of mass differences corresponding to a plurality of fragment ion peaks. It is possible to estimate difference compositions from the individual mass differences by using a composition estimation database (see reference numeral 102). FIG. 9 illustrates a plurality of difference compositions 104 that are estimated. Then, each substructure is estimated from each difference composition by using the substructure estimation database 38. Specifically, by referring to the substructure estimation database 38 concerning a difference composition ($C_2H_3O$) 104a, as indicated by reference numeral 106, for example, a functional group 108a is specified as a reference result. Similarly, by referring to the substructure estimation database 38 concerning a difference composition ($C_6H_5$) 104b, a benzene ring 108b is specified as a reference result. Thus, the substructure estimation database 38 may be used to specify a specific substructure corresponding to each neutral loss.

Figure 10:
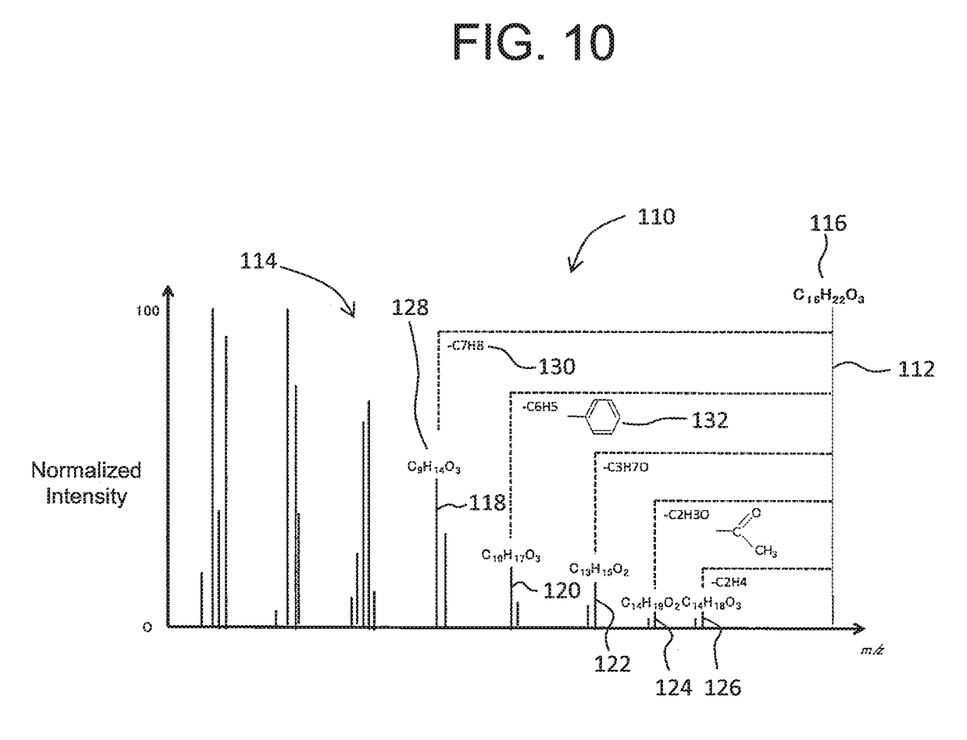
FIG. 10 illustrates a second display example.

FIG. 10 illustrates a second display example. A synthesized mass spectrum 110 includes fragment ion peaks 114 and a molecular ion peak 112. Five fragment ion peaks 118 to 126 are automatically specified from the fragment ion peaks 114 using the molecular ion peak 112 as a reference peak. Near the molecular ion peak 112, a composition 116 which is estimated based on its m/z is indicated. Further, near the five fragment ion peaks 118 to 126, five estimated compositions and difference compositions (see reference numerals 128 and 130, for example) are indicated. Further, as information corresponding to the fragment ion peaks 120 and 124, substructures which are estimated from the compositions (see reference numeral 132, for example) are indicated. The second display example enables collective evaluation of the compositions and the structures of a sample. In particular, by reference to the substructure, what parts are included in a sample can be estimated intuitively or easily. Thus, the second display example may achieve advantages that cannot be obtained by simple display of a mass difference list or simple display of a composition list.

The difference composition may be specified as a difference between the composition estimated from the m/z of the molecular ion peak and the composition estimated from the m/z of the fragment ion peak. Such information is one embodiment of the difference information. Alternatively, only the substructure estimated from the difference composition may be displayed. Information of the substructure may also be one embodiment of the difference information.

Figure 11:
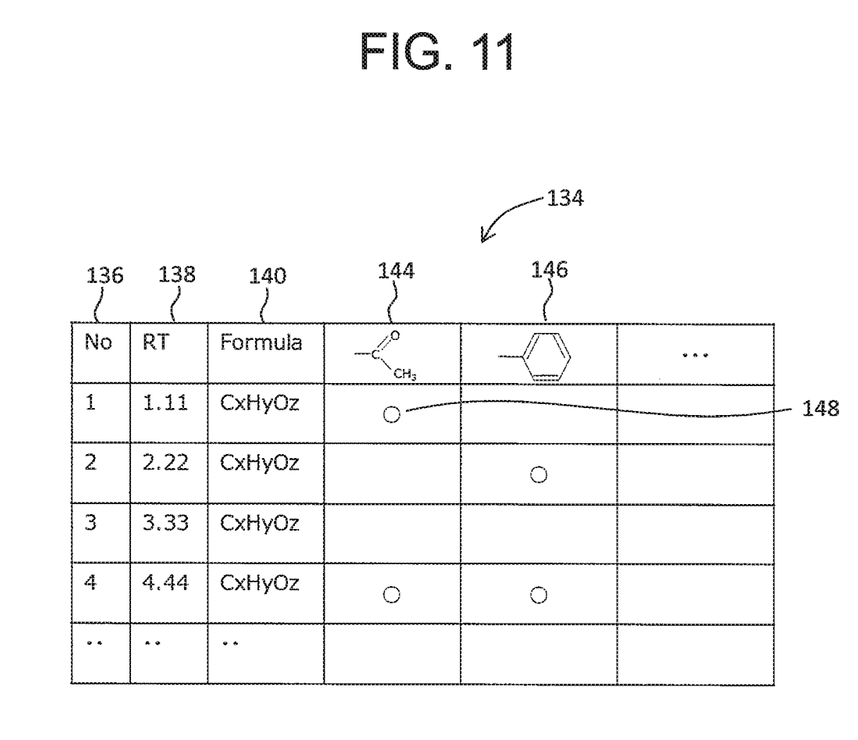
FIG. 11 illustrates a result of gas chromatograph analysis.

FIG. 11 illustrates a chromatogram analysis result in the form of a table 134. Such a table 134 may be displayed on the display section. Specifically, the table 134 includes a plurality of records, each including a peak number 136, a retention time 138, a composition formula 140, information about presence or absence of a first substructure 144, and information about presence or absence of a second substructure 146, for example. Here, reference numeral 148 denotes a flag indicative of presence of a specific substructure. In analyzing chromatogram, a plurality of peaks contained therein are individually analyzed. At this time, the synthesized mass spectrum described above is generated, and presence or absence of the substructures 144 and 146 is determined based on the synthesized mass spectrum. This table 134 makes it possible to specify a plurality of compounds forming the original sample, or to specify the substructure of each compound. This table is created by the data processing unit illustrated in FIG. 1.

Figure 12:
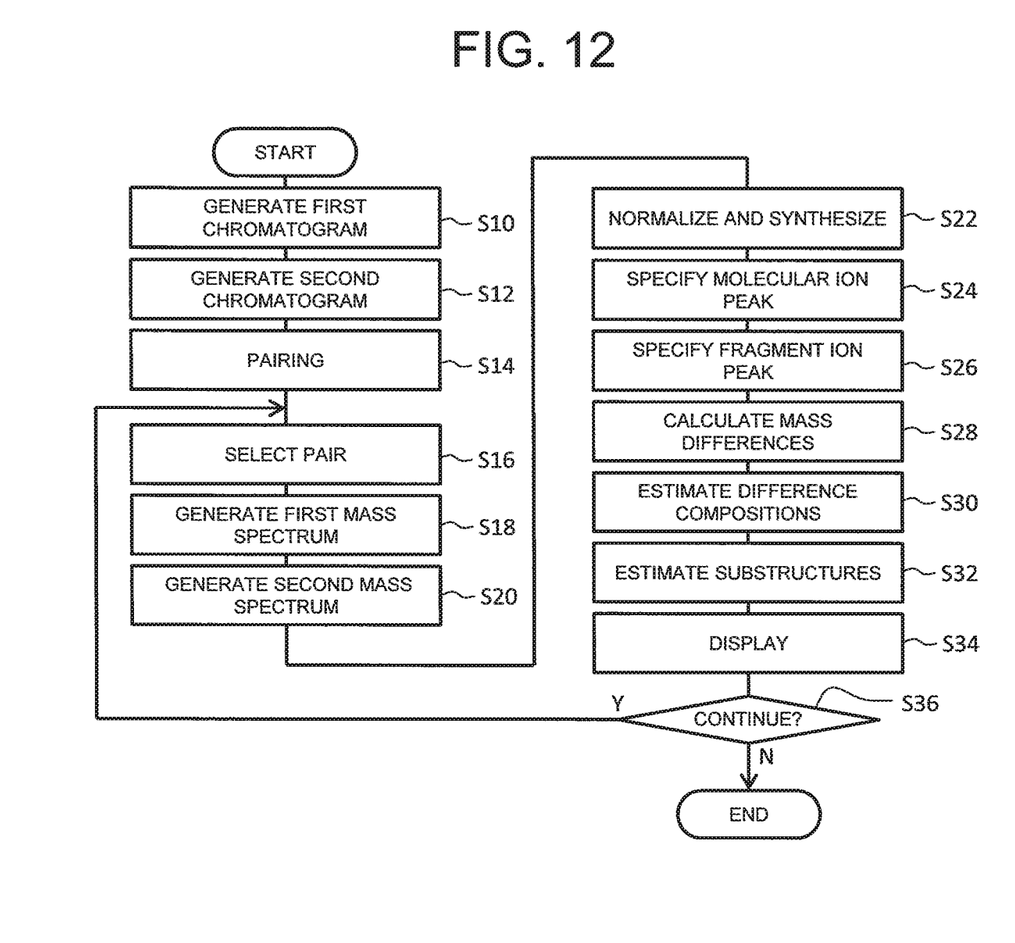
FIG. 12 illustrates a mass spectrum processing method according to an embodiment.

FIG. 12 illustrates a mass spectrum processing method according to an embodiment, in the form of a flowchart. In step S10, a first measurement is performed for an original sample, to thereby generate a first chromatogram. Also, a mass spectrum is generated at each timing on the time axis. In step S12, a second measurement is performed for the same original sample, to thereby generate a second chromatogram. Also, a mass spectrum is generated at each time on the time axis. In step S14, peak pairing is performed between the first chromatogram and the second chromatogram, thereby specifying one or more peak pairs.

In step S16, a peak pair to be analyzed is selected. In step S18, mass spectrum integration is executed within a window including one of peaks of the peak pair to thereby generate a first mass spectrum. In step S20, mass spectrum integration is executed within a window including the other peak to thereby generate a second mass spectrum. In step S22, the first mass spectrum is normalized, and after normalization of the second mass spectrum, the normalized first mass spectrum and the normalized second mass spectrum are synthesized, thereby generating a synthesized mass spectrum. Here, normalization is executed as required.

In step S24, a molecular ion peak is specified, and in step S26, a plurality of fragment ion peaks are searched using the molecular ion as a reference. A plurality of compositions may be further estimated based on m/z of the plurality of fragment ion peaks. In step S28, a plurality of mass differences are calculated between the molecular ion peak and the plurality of fragment ion peaks. In step S30, a plurality of difference compositions are estimated based on the plurality of mass differences. In step S32, a plurality of substructures are estimated based on the plurality of difference compositions. In step S34, the various estimated or calculated information items are displayed along with the synthesized mass spectrum. In step S36, whether or not the above processing is to be applied to the next peak pair is determined. If the above processing is to be applied, the processes in step S16 and the following steps are executed.

Figure 13:
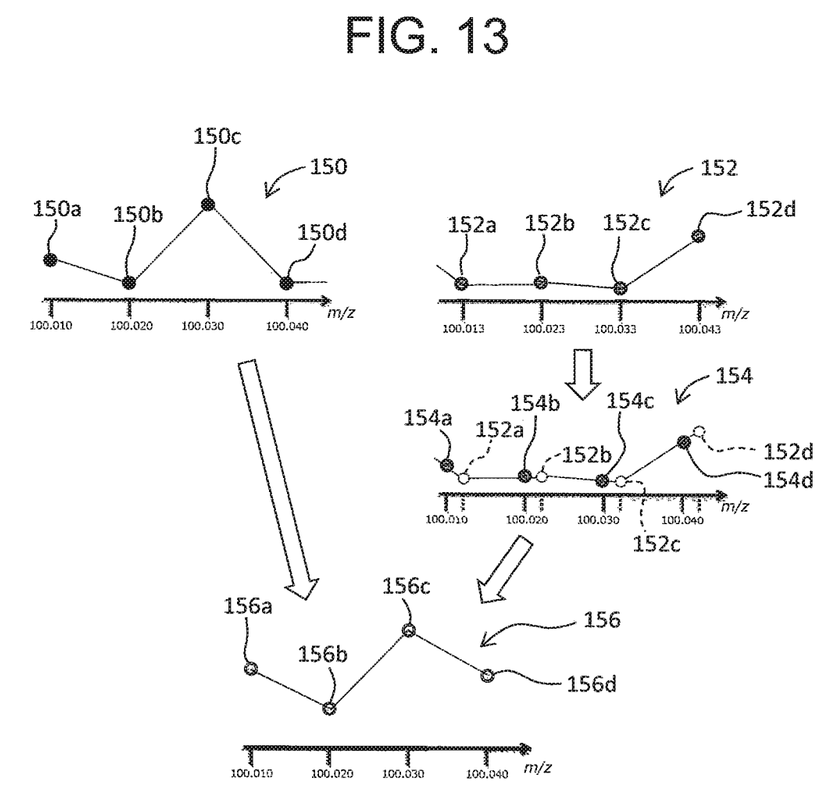
FIG. 13 illustrates first example mass spectrum synthesis processing.

FIG. 13 illustrates an interpolation process that is applied as required in spectrum synthesis. A first mass spectrum 150 includes a plurality of first sample points 150a to 150d, and a second mass spectrum 152 includes a plurality of second sample points 152a to 152d. As illustrated, the locations of the plurality of sample points (specifically, a plurality of m/z) do not match between the two mass spectra 150 and 152, and there is misalignment between them. To address this, in the illustrated example, an interpolation process is applied to the second mass spectrum 152 using the m/z of the first sample points 150a to 150d forming the first mass spectrum 150 as a reference. Specifically, interpolation points 154a to 154d are generated based on the second sample points 152a to 152d. In this case, linear interpolation, polynomial interpolation, or other interpolation methods are employed. The interpolation points 154a to 154d form an interpolated second mass spectrum 154. Subsequently, the first mass spectrum 150 and the interpolated second mass spectrum 154 are synthesized to generate a synthesized mass spectrum 156. The synthesized mass spectrum 156 includes sample points 156a to 156d. The sample points 156a to 156d have an intensity that is a summed value obtained by summing the intensity of the first sample points 150a to 150d and the intensity of the interpolation points 154a to 154d. If there is a misalignment between the mass spectra 150 and 152 in the horizontal axis direction, an interpolation process for addressing the misalignment may be applied.

Figure 14:
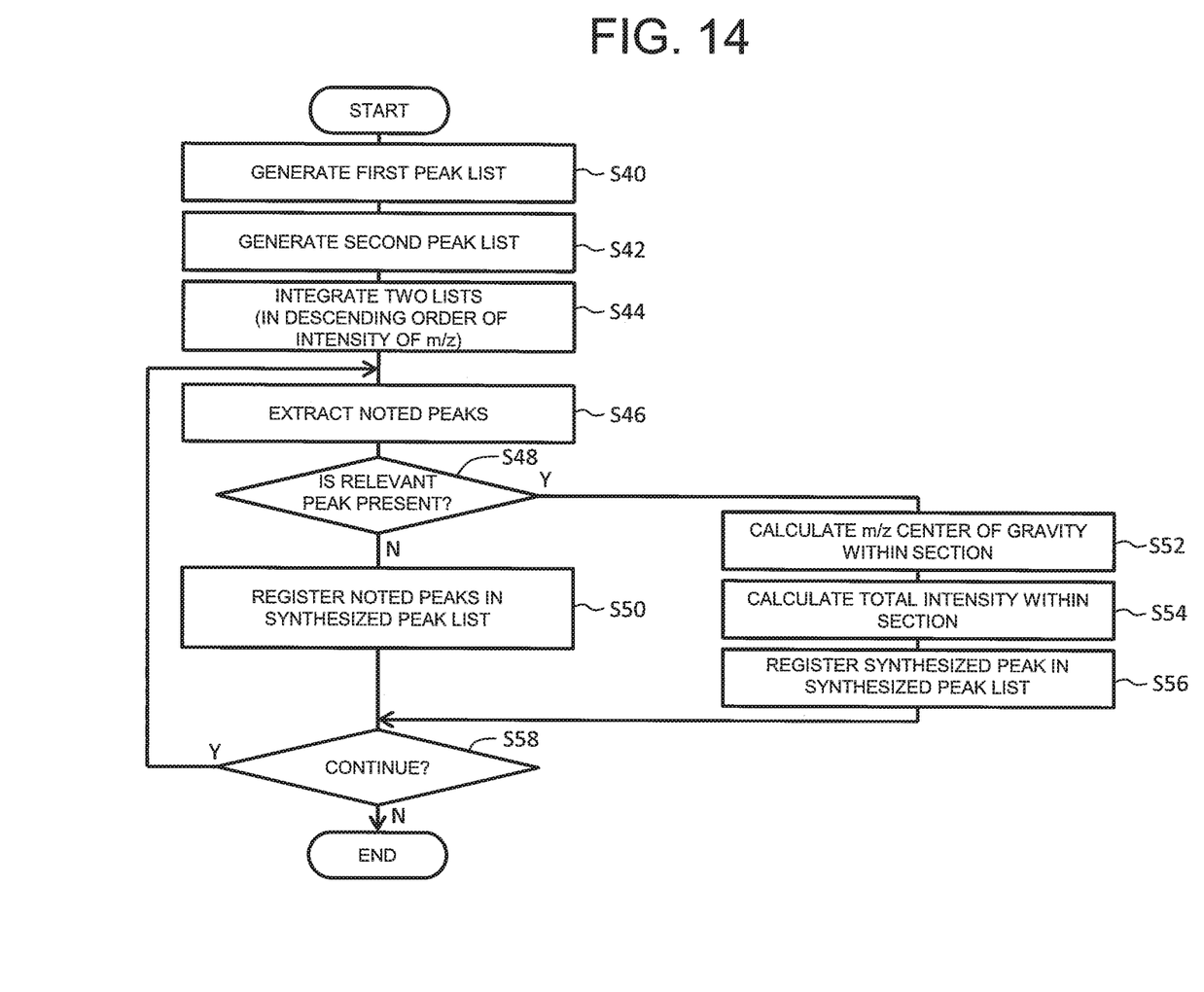
FIG. 14 illustrates second example mass spectrum synthesis processing.

FIG. 14 illustrates another mass spectrum synthesis process in the form of a flowchart. In this process, alignment is performed between two mass spectra.

In step S40, a peak detection process is applied to a first mass spectrum to generate a first peak list. In step S42, a peak detection process is applied to a second mass spectrum to generate a second peak list. Each peak list specifies the m/z and the intensity of each peak. In step S44, the first peak list and the second peak list are integrated to generate an integrated peak list.

In step S46, noted peaks are extracted in the ascending order of intensity from the integrated peak list. In step S48, a neighboring range is set based on the extracted noted peaks, and whether or not one or more relevant peaks are present within the neighboring range is determined in the integrated peak list. If no such relevant peaks are present, in step S50, the noted peaks extracted in step S46 are recorded in a synthesized peak list, for which the integrated peak list may be used.

If it is determined that one or more relevant peaks are present in step S48, in step S52, a center of gravity is calculated based on a plurality of peaks (a noted peak and one or more relevant peaks) that are present within the neighboring range. In this case, the m/z and the intensity of each peak are referred to; the intensity is used as a weight to the m/z. In step S54, a sum of the plurality of intensities is calculated as a total intensity. In step S56, the center of gravity (m/z) and the total intensity are registered in the synthesized peak list as information on a synthesized peak. Here, the one or more relevant peaks may be simply removed without performing calculation of the center of gravity.

In step S58, the processes in step S46 and the subsequent steps are repeated until completion of this process is determined. As a result of the above process, a synthesized mass spectrum is constructed on the synthesized peak list. In displaying, each synthesized peak is shown as a line; that is, the synthesized mass spectra are displayed in the form of a bar chart.

Each mass spectrum may be normalized prior to the synthesis processes illustrated in FIGS. 13 and 14. Typically, prior to the synthesis process, adjustment in the vertical axis direction and horizontal axis direction may be performed. In performing adjustment in the vertical axis direction, the intensity of the maximum peak included in each mass spectrum, or in each peak list, may be adjusted to a predetermined level. When the above alignment is performed, the synthesis ratio of the two spectra may be obtained such that the synthesized mass spectrum may be displayed in a color corresponding to the mass spectrum with a higher synthesis ratio.

The invention claimed is:

1. A mass spectrum processing apparatus comprising:
a processor,
the processor being configured to:
synthesize a first mass spectrum including a fragment ion peak and a second mass spectrum including a molecular ion peak by summing the first mass spectrum and the second mass spectrum to generate a synthesized mass spectrum; and
calculate difference information between the fragment ion peak and the molecular ion peak on the synthesized mass spectrum, wherein
the first mass spectrum is generated under application of a first ionization method, and
the second mass spectrum is generated under application of a second ionization method that is different from the first ionization method, and
wherein the first ionization method is a hard ionization method and the second ionization method is a soft ionization method.

2. The mass spectrum processing apparatus according to claim 1, further comprising:
a display that displays the difference information along with the synthesized mass spectrum.

3. The mass spectrum processing apparatus according to claim 2, wherein
the difference information includes at least one of information representing a difference in mass-to-charge ratios or information representing a difference in compositions.

4. The mass spectrum processing apparatus according to claim 2, wherein
the processor is further configured to estimate a substructure based on the difference information, and
the display displays, in addition to the synthesized mass spectrum and the difference information, information representing the substructure.

5. The mass spectrum processing apparatus according to claim 1, wherein
the processor is further configured to normalize at least one of the first mass spectrum or the second mass spectrum in a direction of an intensity axis in synthesizing the first mass spectrum and the second mass spectrum.

6. The mass spectrum processing apparatus according to claim 1, wherein
the processor is further configured to correct a misalignment in a direction of an m/z axis between the first mass spectrum and the second mass spectrum in synthesizing the first mass spectrum and the second mass spectrum.

7. A mass spectrum processing apparatus comprising:
a processor,
the processor being configured to:
synthesize a first mass spectrum including a fragment ion peak and a second mass spectrum including a molecular ion peak to generate a synthesized mass spectrum; and
calculate difference information between the fragment ion peak and the molecular ion peak on the synthesized mass spectrum, wherein
the first mass spectrum is generated under application of a first ionization method, and
the second mass spectrum is generated under application of a second ionization method that is different from the first ionization method, and
wherein the processor is further configured to:
generate a first chromatogram under application of the first ionization method;
generate a second chromatogram under application of the second ionization method;
generate the first mass spectrum and the second mass spectrum for each pair of peaks that are paired between the first chromatogram and the second chromatogram; and
generate the synthesized mass spectrum for each pair of peaks.

8. A mass spectrum processing method comprising:
synthesizing a first mass spectrum including a fragment ion peak and a second mass spectrum including a molecular ion peak by summing the first mass spectrum and the second mass spectrum to generate a synthesized mass spectrum;
calculating difference information between the fragment ion peak and the molecular ion peak; and
displaying the difference information along with the synthesized mass spectrum, wherein
the first mass spectrum is generated under application of a first ionization method, and the second mass spectrum is generated under application of a second ionization method that is different from the first ionization method, and wherein the first ionization method is a hard ionization method and the second ionization method is a soft ionization method.

* * * * *